US012586728B2

(12) United States Patent
Lee et al.

(10) Patent No.: US 12,586,728 B2
(45) Date of Patent: Mar. 24, 2026

(54) MULTILAYERED CAPACITOR AND MANUFACTURING METHOD THEREOF

(71) Applicant: SAMSUNG ELECTRO-MECHANICS CO., LTD., Suwon-si (KR)

(72) Inventors: Hyoju Lee, Suwon-si (KR); Jinwoo Kim, Suwon-si (KR); Seokhyun Yoon, Suwon-si (KR); Heesun Chun, Suwon-si (KR); Tae Hyung Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 189 days.

(21) Appl. No.: 18/540,138

(22) Filed: Dec. 14, 2023

(65) Prior Publication Data

US 2024/0222033 A1     Jul. 4, 2024

(30) Foreign Application Priority Data

| | | | |
|---|---|---|---|
| Jan. 2, 2023 | (KR) | ..................... | 10-2023-0000158 |
| Mar. 6, 2023 | (KR) | ..................... | 10-2023-0029331 |
| Jul. 21, 2023 | (KR) | ..................... | 10-2023-0095098 |

(51) Int. Cl.
| | |
|---|---|
| *H01G 4/30* | (2006.01) |
| *C04B 35/468* | (2006.01) |
| *C04B 35/64* | (2006.01) |
| *H01G 4/008* | (2006.01) |
| *H01G 4/012* | (2006.01) |
| *H01G 4/12* | (2006.01) |

(52) U.S. Cl.
CPC ........... *H01G 4/30* (2013.01); *C04B 35/4682* (2013.01); *C04B 35/64* (2013.01); *H01G 4/008* (2013.01); *H01G 4/012* (2013.01); *H01G 4/1227* (2013.01)

(58) Field of Classification Search
None
See application file for complete search history.

(56) References Cited

U.S. PATENT DOCUMENTS

| | | | |
|---|---|---|---|
| 2012/0238438 A1* | 9/2012 | Endo | ................... C04B 35/4682 501/1 |
| 2013/0222968 A1 | 8/2013 | Koga et al. | |
| 2018/0130601 A1 | 5/2018 | Kim et al. | |

(Continued)

FOREIGN PATENT DOCUMENTS

| | | | | |
|---|---|---|---|---|
| CN | 1331476 A | * | 1/2002 | ........... C04B 35/468 |
| JP | 2016115876 A | * | 6/2016 | |

(Continued)

OTHER PUBLICATIONS

Extended European Search Report dated Jun. 10, 2024 issued in European Patent Application No. 23218007.5.

*Primary Examiner* — Timothy J. Dole
*Assistant Examiner* — Esther N Lian
(74) *Attorney, Agent, or Firm* — Morgan, Lewis & Bockius LLP

(57) ABSTRACT

A multilayered capacitor including a capacitor body including a dielectric layer and an internal electrode, and an external electrode on the capacitor body, wherein the dielectric layer includes a plurality of dielectric crystal grains, at least one of the plurality of dielectric crystal grains has a core-shell structure, and the shell includes hafnium (Hf).

28 Claims, 15 Drawing Sheets

(56)  References Cited

U.S. PATENT DOCUMENTS

| | | | |
|---|---|---|---|
| 2019/0066920 A1* | 2/2019 | Kim .................... | C04B 35/4682 |
| 2020/0039887 A1* | 2/2020 | Ariizumi .............. | H01G 4/1236 |
| 2022/0199326 A1 | 6/2022 | Kim et al. | |
| 2022/0204407 A1* | 6/2022 | Park .................... | H01F 27/2804 |
| 2022/0254568 A1* | 8/2022 | Murakami .............. | C04B 35/49 |
| 2022/0285094 A1* | 9/2022 | Matsumoto .............. | H01G 4/30 |
| 2022/0375688 A1 | 11/2022 | Yoon et al. | |

FOREIGN PATENT DOCUMENTS

| | | | |
|---|---|---|---|
| KR | 10-2018-0051760 A | 5/2018 | |
| KR | 10-2022-0088099 A | 6/2022 | |

* cited by examiner

500nm

500nm

MULTILAYERED CAPACITOR AND MANUFACTURING METHOD THEREOF

CROSS-REFERENCE TO RELATED APPLICATION

This application claims priority to and the benefit of Korean Patent Application No. 10-2023-0029331 filed in the Korean Intellectual Property Office on Mar. 6, 2023, Korean Patent Application No. 10-2023-0000158 filed in the Korean Intellectual Property Office on Jan. 2, 2023, and Korean Patent Application No. 10-2023-0095098 filed in the Korean Intellectual Property Office on Jul. 21, 2023, the entire contents of which are incorporated herein by reference.

BACKGROUND

(a) Technical Field

This disclosure relates to a multilayered capacitor and a method of manufacturing the same.

(b) Description of the Related Art

Recently, development of automotive electric device parts has been progressing rapidly. A multilayered capacitor (MLCC), one of electric device parts, has advantages of being small and having high capacity and thus is used as a part for various electronic products.

Unlike a general multilayered capacitor, a multilayered capacitor applied to the automotive electric device parts may be applicable to engines, transmissions, or so and thus can realize capacity at a high temperature of about 150° C. or higher and may have high reliability even at the high temperature.

In order to realize the high reliability and a high dielectric constant at a high temperature, various additives are added to a dielectric base material, but there is a difficulty in uniformly adding the additives to the dielectric base material, which puts a limitation to the development of the multilayered capacitor for the automotive electric device parts.

SUMMARY

One aspect of the present disclosure provides a multilayered capacitor in which as the bandgap of the dielectric increases, a potential barrier between the core and the shell increases, resulting in improving withstand voltage characteristics at high temperatures, maintaining high dielectric constant, and improving reliability at a high temperature and a high pressure.

A multilayered capacitor according to an aspect includes a capacitor body including a dielectric layer and an internal electrode, and an external electrode on the capacitor body, wherein the dielectric layer includes a plurality of dielectric crystal grains, at least one of the plurality of dielectric crystal grains has a core-shell structure including a core and a shell on the core, and the shell includes hafnium (Hf).

In a line analysis using transmission electron microscope-energy dispersive X-ray analysis (TEM-EDX) on the at least one of the plurality of dielectric crystal grains having the core-shell structure, among results from a center of a core to a grain boundary on any side of the at least one of the plurality of dielectric crystal grains having the core-shell structure, the shell has a first peak having the largest atom % of hafnium based on all atoms in the shell, and the first peak is located closer to the core than to the grain boundary.

An atom % of hafnium at the grain boundary of the shell may be smaller than that of the first peak.

The shell may further have a second peak having a second largest atom % of hafnium, and the second peak may be located between the first peak and grain boundary.

When the atom % of hafnium in the first peak is $N_{Hf, 1st\text{-}peak}$, the atom % of hafnium in the second peak is $N_{Hf,2nd\text{-}peak}$, and the atom % of hafnium at the grain boundary is $N_{Hf,GB}$, $N_{Hf, 1st\text{-}peak} > N_{Hf,2nd\text{-}peak} > N_{Hf,GB}$ may be satisfied.

The atom % of hafnium in the shell may increase from a boundary between the core and the shell to the first peak, increase to the second peak after passing the first peak, and decrease from the second peak to the grain boundary.

When the atom % of hafnium at the first peak is $N_{Hf,1st\text{-}peak}$, the atom % of hafnium at a midpoint between the first peak and the grain boundary is $N_{Hf, middle}$, and the atom % of hafnium at the grain boundary is $N_{Hf,GB}$, $N_{Hf,1st\text{-}peak} > N_{Hf, middle} > N_{Hf,GB}$ may be satisfied.

The atom % of hafnium in the shell may increase from a boundary between the core and the shell to the first peak, may decrease or remain constant to a midpoint after passing the first peak, and may decrease from the midpoint to the grain boundary.

The first peak may be located within 10 nm from the boundary between the core and the shell.

The plurality of dielectric crystal grains may include BaTiOs as a main component, and hafnium (Hf), manganese (Mn), chromium (Cr), silicon (Si), aluminum (Al), magnesium (Mg), tin (Sn), antimony (Sb), germanium (Ge), gallium (Ga), indium (In), dysprosium (Dy), or a combination thereof as a subcomponent.

The hafnium (Hf) may be doped into $BaTiO_3$.

The core may include $BaTiO_3$, and the shell may include $Ba(Ti, Hf)O_3$.

The shell may include the subcomponent in a total amount of greater than 0.1 parts by mole and less than or equal to 30.0 parts by mole relative to 100 parts by mole of the main component.

The core may include the subcomponent in a total amount of less than or equal to 0.1 parts by mole relative to 100 parts by mole of the main component.

An average grain size of the plurality of dielectric crystal grains may be greater than or equal to 50 nm and less than or equal to 300 nm.

A method of manufacturing a multilayered capacitor according to another aspect includes preparing dielectric powder doped with hafnium (Hf), manufacturing a dielectric green sheet using the dielectric powder, and forming a conductive paste layer on a surface of the dielectric green sheet, stacking dielectric green sheets having the conductive paste layer formed thereon to manufacture a dielectric green sheet stack, firing the dielectric green sheet stack to manufacture a capacitor body including a dielectric layer and an internal electrode, and forming an external electrode on one surface of the capacitor body.

The dielectric layer includes a plurality of dielectric crystal grains, at least one of the plurality of the dielectric crystal grains has a core-shell structure including a core and a shell on the core, and the shell includes hafnium (Hf).

In a line analysis using transmission electron microscope-energy dispersive X-ray analysis (TEM-EDX) on the at least one of the plurality of dielectric crystal grains having the core-shell structure, among results from a center of a core to a grain boundary on any side of the at least one of the plurality of dielectric crystal grains having the core-shell structure, the shell has a first peak having the largest atom % of hafnium based on all atoms in the shell, and the first peak is located closer to the core than to the grain boundary.

The dielectric powder doped with hafnium (Hf) may have a core-shell structure including a first core and a first shell on the first core.

The core may include BaTiOs and the shell may include Ba(Ti, Hf)O$_3$.

The dielectric powder doped with hafnium (Hf) may include hafnium (Hf) at less than or equal to 3 atom % based on a total dielectric powder.

The dielectric powder doped with hafnium (Hf) may be prepared by hydrothermal synthesis at 180° C. or higher.

A method of manufacturing a multilayered capacitor according to another aspect includes preparing dielectric powder doped with hafnium (Hf) at less than or equal to 3 atom % based on a total dielectric powder, manufacturing a dielectric green sheet using the dielectric powder, and forming a conductive paste layer on a surface of the dielectric green sheet, stacking dielectric green sheets having the conductive paste layer formed thereon to manufacture a dielectric green sheet stack, firing the dielectric green sheet stack to manufacture a capacitor body including a dielectric layer and an internal electrode, and forming an external electrode on one surface of the capacitor body.

The dielectric layer includes a plurality of dielectric crystal grains, at least one of the plurality of the dielectric crystal grains has a core-shell structure including a core and a shell on the core, and the shell includes hafnium (Hf).

In a line analysis using transmission electron microscope-energy dispersive X-ray analysis (TEM-EDX) on the at least one of the plurality of dielectric crystal grains having the core-shell structure, among results from a center of a core to a grain boundary on any side of the at least one of the plurality of dielectric crystal grains having the core-shell structure, the shell has a first peak having the largest atom % of hafnium based on all atoms in the shell, and the first peak is located closer to the core than to the grain boundary.

The dielectric powder doped with hafnium (Hf) may be prepared by hydrothermal synthesis at 180° C. or higher.

The dielectric powder doped with hafnium (Hf) may have a core-shell structure including a first core and a first shell on the first core.

The dielectric powder may be further doped with silicon (Si) and dysprosium (Dy).

The core may include BaTiOs and the shell may include Ba(Ti, Hf)O$_3$.

A multilayered capacitor according to an aspect includes a capacitor body including a dielectric layer and an internal electrode, and an external electrode on the capacitor body, wherein the dielectric layer includes a plurality of dielectric crystal grains including a main component, and a subcomponent including hafnium (Hf), at least one of the plurality of dielectric crystal grains has a core-shell structure including a core and a shell on the core.

The shell includes the subcomponent in a total amount of greater than 0.1 moles and less than or equal to 30.0 parts by mole relative to 100 parts by mole of the main component, and the core includes the subcomponent in a total amount of less than or equal to 0.1 parts by mole relative to 100 parts by mole of the main component.

In a line analysis using transmission electron microscope-energy dispersive X-ray analysis (TEM-EDX) on the at least one of the plurality of dielectric crystal grains having the core-shell structure, among results from a center of a core to a grain boundary on any side of the at least one of the plurality of dielectric crystal grains having the core-shell structure, the shell has a first peak having the largest atom % of hafnium based on all atoms in the shell, and the first peak is located closer to the core than to the grain boundary.

The subcomponent may further include silicon (Si) and dysprosium (Dy).

An atom % of hafnium at the grain boundary of the shell may be smaller than that of the first peak.

The first peak may be located within 10 nm from the boundary between the core and the shell.

The main component may include BaTiO$_3$.

According to the multilayered capacitor according to one aspect, the potential barrier between the core and the shell increases as the bandgap of the dielectric increases, resulting in improving withstand voltage characteristics at high temperatures, maintaining high dielectric constant, and improving reliability at a high temperature and a high pressure.

DETAILED DESCRIPTION

Figure 1:
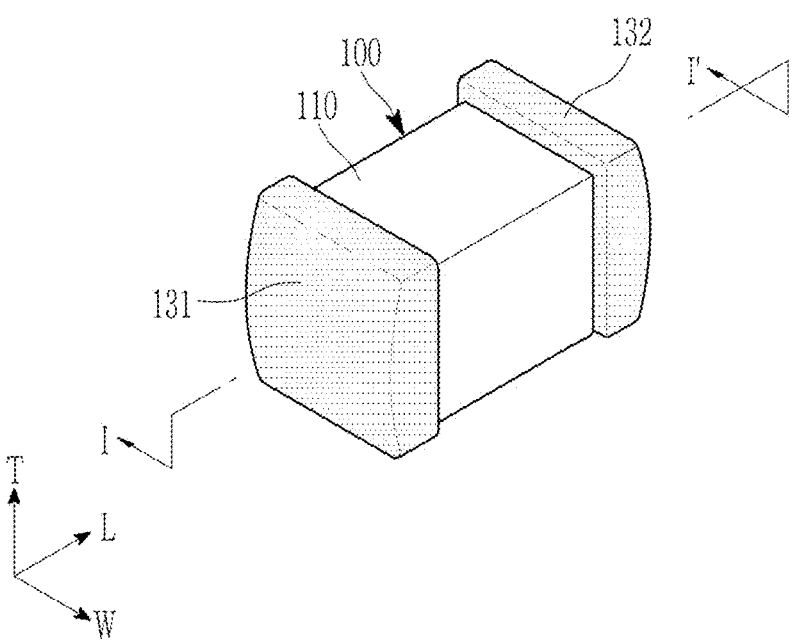
FIG. 1 is a perspective view illustrating a multilayered capacitor according to an embodiment.

The present disclosure will be described more fully hereinafter with reference to the accompanying drawings, in which embodiments of the disclosure are shown. The drawings and description are to be regarded as illustrative in nature and not restrictive. Like reference numerals designate like elements throughout the specification. Further, the accompanying drawings are provided only to allow embodiments disclosed in the present specification to be easily understood, and are not to be interpreted as limiting the spirit disclosed in the present specification, and it is to be understood that the present disclosure includes all modifications, equivalents, and substitutions without departing from the scope and spirit of the present disclosure.

Terms including ordinal numbers such as first, second, and the like will be used only to describe various constituent elements, and are not to be interpreted as limiting these constituent elements. The terms are only used to differentiate one constituent element from other constituent elements.

It is to be understood that when one constituent element is referred to as being "connected" or "coupled" to another constituent element, it may be connected or coupled directly to the other constituent element or may be connected or coupled to the other constituent element with a further constituent element intervening therebetween. In contrast, it should be understood that, when it is described that an element is "directly coupled" or "directly connected" to another element, no element is present between the element and the other element.

Throughout the specification, it should be understood that the term "include," "comprise," "have," or "configure" indicates that a feature, a number, a step, an operation, a constituent element, a part, or a combination thereof described in the specification is present, but does not exclude a possibility of presence or addition of one or more other features, numbers, steps, operations, constituent elements, parts, or combinations, in advance. Unless explicitly described to the contrary, the word "comprise" and variations such as "comprises" or "comprising" will be understood to imply the inclusion of stated elements but not the exclusion of any other elements.

Figure 2:
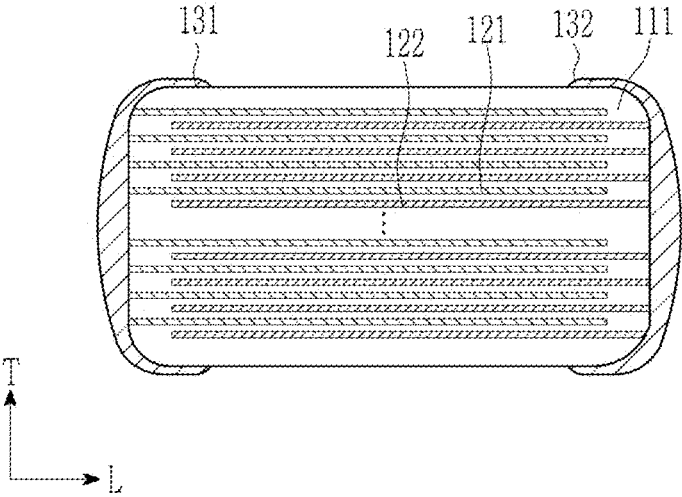
FIG. 2 is a cross-sectional view of the multilayered capacitor taken along the line I-I' in FIG. 1.
Figure 3:
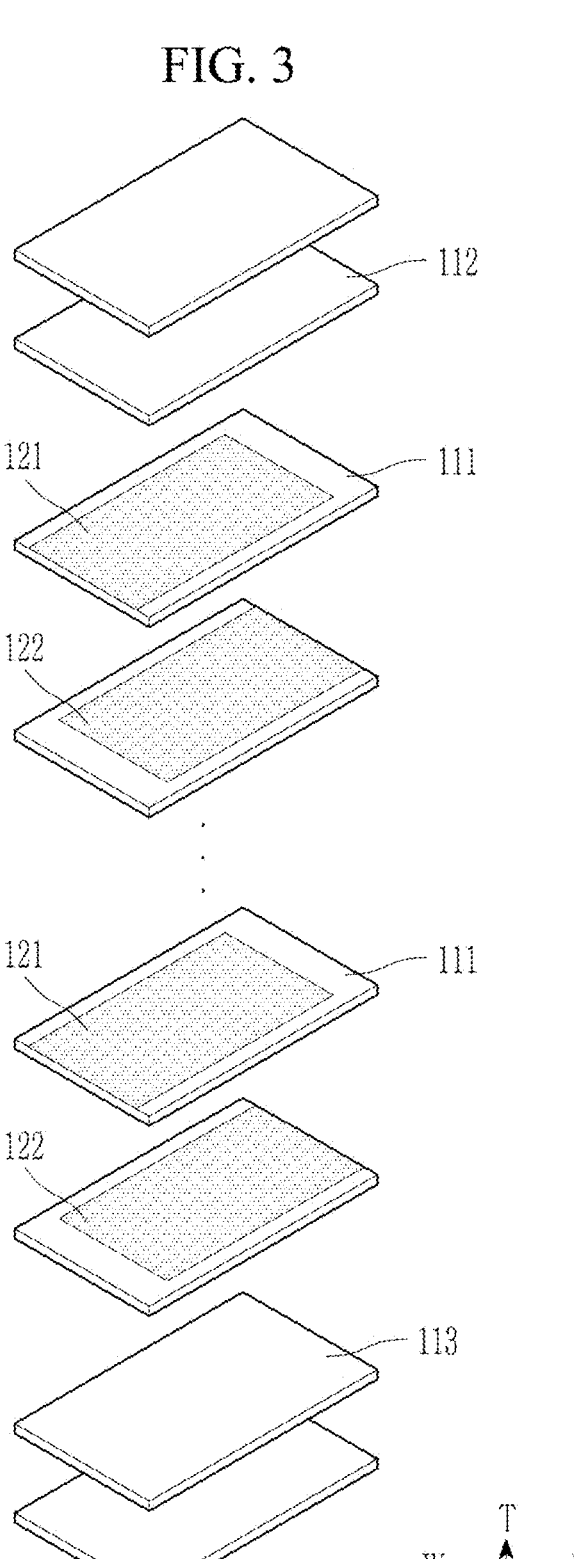
FIG. 3 is an exploded perspective view illustrating a stacked structure of internal electrodes in the capacitor body of FIG. 1.

FIG. 1 is a perspective view illustrating a multilayered capacitor 100 according to an embodiment, FIG. 2 is a cross-sectional view of the multilayered capacitor 100 taken along the line I-I' in FIG. 1, and FIG. 3 is an exploded perspective view illustrating a stacked structure of internal electrodes in the capacitor body 110 of FIG. 1.

When directions are defined to clearly describe the present embodiment, the L-axis, W-axis, and T-axis indicated in the drawings represent the longitudinal direction, the width direction, and the thickness direction of the capacitor body 110, respectively. Herein, the thickness direction (T-axis direction) may be a direction perpendicular to the wide surface (main surface) of the sheet-shaped components, and may be, for example, used in the same concept as the stacking direction in which the dielectric layers 111 are stacked. The longitudinal direction (L-axis direction) may be a direction substantially perpendicular to the thickness direction (T-axis direction) in a direction extending parallel to the wide surface (main surface) of the sheet-shaped components, and may be, for example, a direction in which the first and second external electrodes 131 and 132 are disposed. The width direction (W-axis direction) may be a direction that extends parallel to the wide surface (main surface) of the sheet-shaped components and is substantially perpendicular to the thickness direction (T-axis direction), and the length of the sheet-like components in the longitudinal direction (L-axis direction) may be longer than the length in the width direction (W-axis direction).

Referring to FIGS. 1 to 3, the multilayered capacitor 100 according to the present embodiment may include the capacitor body 110, and first and second external electrodes 131 and 132 disposed at both ends of the capacitor body 110 which face each other in the longitudinal direction (L-axis direction).

The capacitor body 110 may have, for example, a substantially hexahedral shape.

In this embodiment, for convenience of explanation, in the capacitor body 110, surfaces opposite to each other in the thickness direction (T-axis direction) are defined as first and second surfaces, surfaces connected to the first and second surfaces and facing each other in the longitudinal direction (L-axis direction) are defined as third and fourth surfaces, and surfaces connected to the first and second surfaces, connected to the third and fourth surfaces, and facing each other in the width direction (W-axis direction) are defined as fifth and sixth surfaces.

For example, the first surface, which is a lower surface, may be a surface facing a mounting direction. In addition, the first to sixth surfaces may be flat, but are not limited thereto, and for example, the first to sixth surfaces may be curved surfaces with a convex central portion, and a corner of each surface which is a boundary, may be round.

The shapes and dimensions of the capacitor body 110 and the number of stacked dielectric layers 111 are not limited to those shown in the drawings of the present embodiment.

The capacitor body 110 is formed by stacking a plurality of the dielectric layers 111 in the thickness direction (T-axis direction) and then firing them, and includes a plurality of dielectric layers 111, and a plurality of first and second internal electrodes 121 and 122 which are alternately disposed in a thickness direction (T-axis direction) with the dielectric layers 111 interposed therebetween.

Herein, the boundary between the respective dielectric layers 111 adjacent to each other of the capacitor body 110 may be integrated to the extent that it is difficult to check without using a scanning electron microscope (SEM).

Also, the capacitor body 110 may include an active region and cover regions 112 and 113.

The active region contributes to generating a capacitance of the multilayered capacitor 100. For example, the active region may be a region in which the first or second internal electrode 121 or 122 are stacked and overlapped with each other along the thickness direction (T-axis direction).

The cover regions 112 and 113 may be respectively disposed on the first and the second surfaces of the active region in the thickness direction (T-axis direction) as thickness-direction margin portions. The cover regions 112 and 113 may be formed by stacking a single dielectric layer 111 or two or more dielectric layers 111 on an upper surface and a lower surface of the active region, respectively.

In addition, the capacitor body 110 may further include a side cover region. The side cover region is a width-direction margin portion, and may be respectively disposed on the fifth and sixth surfaces of the active region in the width direction (W-axis direction). Such a side cover region may be formed by coating a conductive paste layer for forming an internal electrode only on a portion of the surface of the dielectric green sheet, stacking dielectric green sheets on which a conductive paste layer is not coated on both side surfaces of the dielectric green sheet, and firing the same.

The cover regions and the side cover regions serve to prevent damage to the first and second internal electrodes 121 and 122 due to physical or chemical stress.

Figure 4:
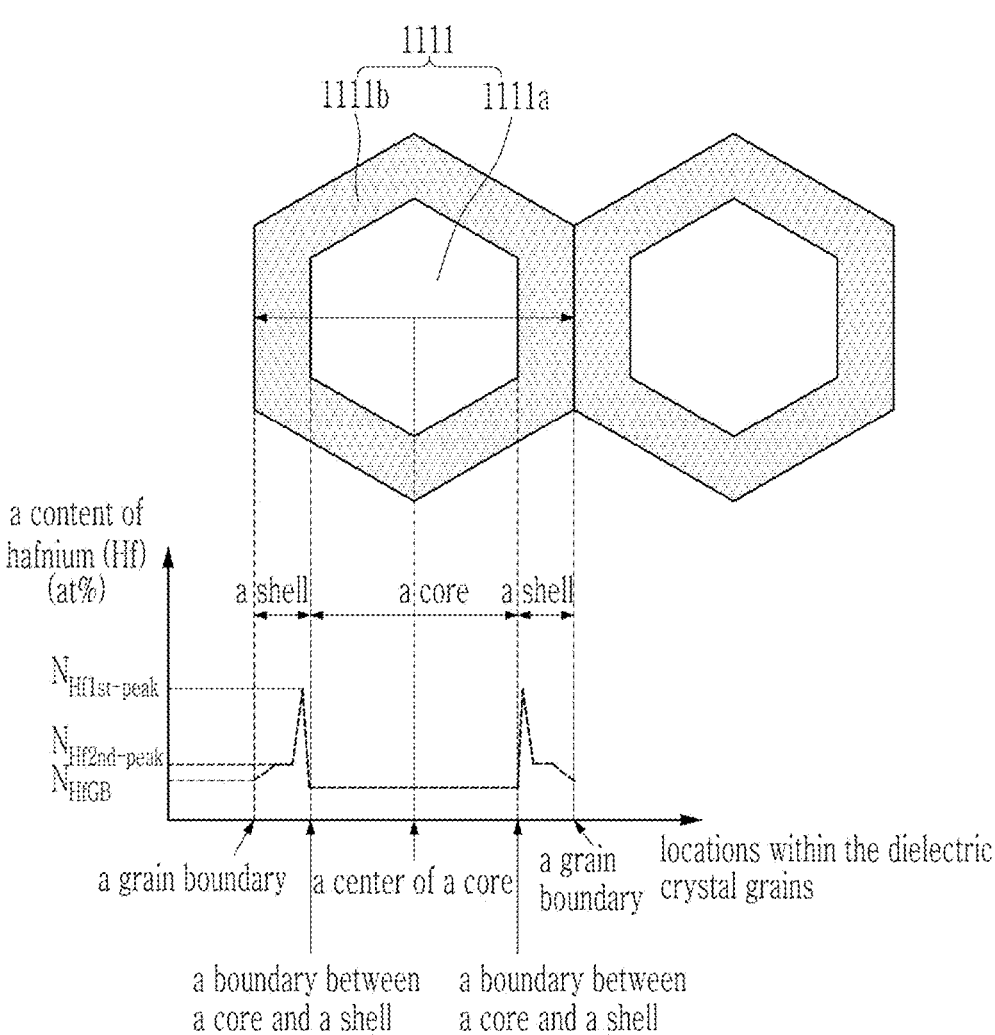
FIG. 4 is a view showing configurations of the dielectric crystal grains and changes in the content of hafnium (Hf) according to locations within the dielectric crystal grains.

FIG. 4 is a view showing configurations of the dielectric crystal grains 1111 of the dielectric layer 111 and changes in the content of hafnium (Hf) according to locations within the dielectric crystal grains 1111. Hereinafter, the dielectric layer 111 will be described in detail with reference to FIG. 4.

The dielectric layer 111 includes a plurality of dielectric crystal grains 1111.

The dielectric crystal grain 1111 includes a main component and a subcomponent.

The main component may be a dielectric material of $Ba_mTiO_3$ $(0.995 \leq m \leq 1.010)$, $(Ba_{1-x}Ca_x)_m(Ti_{1-y}Zr_y)O_3$ $(0.995 \leq m \leq 1.010, 0 \leq x \leq 0.10,$ and $0 < y \leq 0.20)$, $Ba_m(Ti_{1-x}Zr_x)O_3$ $(0.995 \leq m \leq 1.010$ and $x \leq 0.10)$, $(Ba_{1-x}Ca_x)_m(Ti_{1-y}Sn_y)O_3$ $(0.995 \leq m \leq 1.010, 0 \leq x \leq 0.10,$ and $0 < y \leq 0.20)$, or a combination thereof.

The subcomponent may include hafnium (Hf), manganese (Mn), chromium (Cr), silicon (Si), aluminum (Al), magnesium (Mg), tin (Sn), antimony (Sb), germanium (Ge), gallium (Ga), indium (In), dysprosium (Dy), or a combination thereof.

In addition, the subcomponent may further include lanthanum (La), yttrium (Y), actinium (Ac), cerium (Ce), praseodymium (Pr), neodymium (Nd), promethium (Pm), samarium (Sm), europium (Eu), Gadolinium (Gd), terbium (Tb), holmium (Ho), erbium (Er), thulium (Tm), ytterbium (Yb), lutetium (Lu), or a combination thereof.

In the dielectric crystal grain 1111, there may be portions having a different mole ratio of the subcomponent to the main component each other, and for example, at least one of a plurality of dielectric crystal grains 1111 may have a core-shell structure. The dielectric crystal grain 1111 having the core-shell structure includes a dielectric core 1111a in one dielectric crystal grain 1111 and a shell 1111b surrounding the core 1111a.

The core 1111a and the shell 1111b may have a different mole ratio of the subcomponent to the main component, and for example, the mole ratio of the subcomponent to the main component may be sharply changed at a boundary of the core 1111a and the shell 1111b. Accordingly, the boundary of the core 1111a and the shell 1111b may be easily distinguished, which may be confirmed through a transmission electron microscope-energy dispersive X-ray analysis (TEM-EDX).

For example, in the cross-section of the capacitor body 110 cut in the center of the W-axis direction in the L-axis direction and the T-axis direction, when a line analysis of the dielectric crystal grain 1111 of the dielectric layer 111 in the center of an active region is performed by using an energy disperse x-ray spectrometer (EDS) installed in a transmission electron microscope (TEM), where a total content of the subcomponent sharply starts to increase toward any one grain boundary direction of the dielectric crystal grain 1111 from the core 1111a of the dielectric crystal grain 1111 is regarded as the boundary of the core 1111a and the shell 1111b, which easily distinguishes the core 1111a and the shell 1111b. For example, as will be described later, the total content of the subcomponent toward any one grain boundary direction of the dielectric crystal grain 1111 from the core 1111a of the dielectric crystal grains 1111 may sharply increase from less than or equal to 0.1 parts by mole to less than or equal to 30.0 parts by mole based on 100 parts by mole of the main component in the core 1111a.

Herein, the center of the core 1111a may be determined as a point where the maximum major axis of the core 1111a meets the maximum minor axis among the minor axes of the core 1111a. In addition, the EDS (energy disperse x-ray spectrometer) line analysis may process along the maximum major axis passing through the center of the core 1111a of the dielectric crystal grain 1111. Or, a method of binarizing parts with a contrast difference in the transmission electron microscope image and the like may be adopted to define the boundary between the core 1111a and the shell (S) or a boundary between shell (S) and a grain boundary (GB).

For example, the core 1111a may include less than or equal to about 0.1 parts by mole of the subcomponent based on about 100 parts by mole of the main component, and the shell 1111b may include the subcomponent in an amount of greater than about 0.1 parts by mole and less than or equal to about 30.0 parts by mole, or greater than about 0.1 parts by mole and less than or equal to about 20.0 parts by mole in total based on about 100 parts by mole of the main component. When the core 1111a includes greater than about 0.1 parts by mole of the subcomponent based on about 100 parts by mole of the main component, material properties of the pure dielectric material (e.g., $BaTiO_3$) may be changed, and when the shell 1111b includes less than or equal to about 0.1 parts by mole of the subcomponent based on about 100 parts by mole of the main component, a dielectric constant may be more widely changed according to a temperature, but when greater than about 30.0 parts by mole of the subcomponent is included, initial insulation resistance may be lowered. The amount of the subcomponent relative to the main component may be determined by TEM-EDX. Other methods and/or tools appreciated by one of ordinary skill in the art, even if not described in the present disclosure, may also be used.

In other words, in the core 1111a, the subcomponent may not be present or if any, in a small amount. Accordingly, the core 1111a includes no impurities but a pure main component alone, and the pure main component may in general have a high dielectric constant than a main component doped with impurity elements. Accordingly, the core 1111a may play a role of maintaining a dielectric constant.

The shell 1111b may include more subcomponent than the core 1111a. In the shell 1111b, the subcomponent doped at the B-site of the main component (perovskite $ABO_3$ structure) has an effect of increasing bandgap energy in which other rare earth elements and doping elements diffuse into the dielectric crystal grain 1111. Accordingly, the shell 1111b may serve as a barrier to suppress the diffusion of other rare earth elements and doping elements into the dielectric crystal grain 1111. The shell 1111b plays a role of suppressing growth of the dielectric crystal grains 1111 and thus contributing to atomization of the dielectric crystal grain 1111. In addition, the subcomponent doped at the A-site of the main component in the shell 1111b may play a role of improving reliability and dielectric constant.

When hafnium (Hf) is added as a subcomponent to the dielectric material, the bandgap energy of the dielectric material increases, reducing a leakage current. However, in order to introduce the hafnium (Hf) into the dielectric material, when a method of mixing $HfO_2$ with dielectric powder and sintering the mixture at a high temperature is used, the method has a disadvantage in process that $HfO_2$ is difficult to crush due to high hardness and also, a difficulty that $HfO_2$ is difficult to uniformly disperse and diffuse in the dielectric material due to a high melting point. Accordingly, the hafnium (Hf) may be introduced in a very high content toward the grain boundary rather than inside the dielectric crystal grain 1111.

In this embodiment, as will be described, $HfO_2$ is not mixed with the dielectric powder but doped in the dielectric material in a powder state to prepare the dielectric powder doped with hafnium (Hf), and the hafnium (Hf)-doped dielectric powder may be used to form the dielectric layer 111, so that the content of hafnium (Hf) in the dielectric crystal grain 1111 may be the highest around the boundary between the core 1111a and the shell 1111b but decrease toward the grain boundary.

When a large amount of hafnium (Hf) is present around the boundary between the core 1111a and the shell 1111b in the dielectric crystal grain 1111, the bandgap of the dielectric crystal grain 1111 is increased, increasing a potential barrier between the core 1111a and the shell 1111b and thereby maintaining excellent withstand voltage characteristics and a high dielectric constant at a high temperature and improving reliability at the high temperature under a high pressure.

For example, referring to FIG. 4, in the dielectric crystal grain 1111 having the core-shell structure, when the line analysis is performed through the transmission electron microscope-energy dispersive X-ray analysis (TEM-EDX) from the center of the core 1111a to a grain boundary at one side, a first peak ($N_{Hf,1st\text{-}peak}$) having the largest atom % of hafnium based on a total atom % of the shell 1111b is located closer to the core 1111a than to the grain boundary.

Herein, in the dielectric crystal grain 1111, a hafnium (Hf) content according to a position, as a result of the line analysis through the transmission electron microscope-energy dispersive X-ray analysis (TEM-EDX), may be calculated as a percentage (at %) of hafnium (Hf) atoms to all atoms at each measurement position.

In addition, when the line analysis through the transmission electron microscope-energy dispersive X-ray analysis (TEM-EDX) is performed along the maximum major axis passing through the center of the core 1111a of the dielectric crystal grain 1111, two transmission electron microscope-energy dispersive X-ray analysis (TEM-EDX) results in both directions based on the center of the core 1111a may be obtained, wherein the first peak ($N_{Hf,1st\text{-}peak}$) having the largest atom % of hafnium may be determined within only one of the two transmission electron microscope-energy dispersive X-ray analysis (TEM-EDX) results.

The first peak ($N_{Hf,1st\text{-}peak}$) may be located within about 10 nm from the boundary of the core 1111a and the shell 1111b. When the first peak ($N_{Hf,1st\text{-}peak}$) is positioned within about 10 nm from the boundary of the core 1111a and the shell 1111b, the bandgap of a dielectric material increases, increasing the potential barrier between the core and the shell increases and thereby, maintaining excellent withstand voltage characteristics and a high dielectric constant at a high temperature and consequently, improving reliability at the high temperature under a high pressure.

The shell 1111b may have a second peak ($N_{Hf,2nd\text{-}peak}$) having the second largest atom % of hafnium. The second peak ($N_{Hf,2nd\text{-}peak}$) may be located between the first peak ($N_{Hf,1st\text{-}peak}$) and the grain boundary. In addition, atom % of hafnium at the grain boundary of the shell 1111b may be smaller than that of the first peak ($N_{Hf,1st\text{-}peak}$) and even smaller than that at the second peak ($N_{Hf,2nd\text{-}peak}$).

In other words, atom % of hafnium at the first peak is $N_{Hf,1st\text{-}peak}$, atom % of hafnium at the second peak is $N_{Hf,2nd\text{-}peak}$, and atom % of hafnium at the grain boundary is $N_{Hf,GB}$, which may satisfy $N_{Hf,1st\text{-}peak} > N_{Hf,2nd\text{-}peak} > N_{Hf,GB}$.

For example, atom % of hafnium in the shell 1111b may include a plurality of peaks in addition to the first peak and the second peak, and when the maxima of these peaks are connected, atom % of hafnium in the shell 1111b may sharply increase from the boundary between the core 1111a and the shell 1111b, keep increasing to the second peak after passing the first peak, and then, decrease from the second peak to the grain boundary.

On the other hand, the shell 1111b may have no second peak ($N_{Hf,2nd\text{-}peak}$) having the second largest atom % of hafnium. Herein, a midpoint may be located between the first peak ($N_{Hf,1st\text{-}peak}$) and the grain boundary. In addition, atom % ($N_{Hf,middle}$) of hafnium at the midpoint may be smaller than that of the first peak ($N_{Hf,1st\text{-}peak}$) but larger than that of the grain boundary.

In other words, atom % of hafnium at the first peak is $N_{Hf,1st\text{-}peak}$, atom % of hafnium at the midpoint is ($N_{Hf,middle}$), and atom % of hafnium at the grain boundary is ($N_{Hf,GB}$), which may satisfy $N_{Hf,1st\text{-}peak} > N_{Hf,middle} > N_{Hf,GB}$.

For example, in the shell 1111b, atom % of hafnium rapidly increases to the first peak from the boundary between the core 1111a and the shell 1111b, but after the first peak, gradually decreases or substantially remain constant and then, decreases from the midpoint to the grain boundary.

As described above, as the dielectric layer 111 is formed by using the dielectric powder doped with hafnium (Hf) rather than mixing $HfO_2$ with dielectric powder, the hafnium (Hf) may be doped on a dielectric material, for example, $BaTiO_3$. In other word, the core 1111a of the dielectric crystal grain 1111 may include $BaTiO_3$, and the shell 1111b may include $Ba(Ti, Hf)O_3$.

The dielectric crystal grain 1111 having a core-shell structure may have an average diameter of about 100 nm to about 1,000 nm, and the core 1111a of the dielectric crystal grain 1111 having a core-shell structure may have an average diameter of about 50 nm to about 500 nm. In some embodiments, an average grain size of the plurality of dielectric crystal grains may be greater than or equal to about 50 nm and less than or equal to about 300 nm. The average grain size may be obtained by TEM. Other methods and/or tools appreciated by one of ordinary skill in the art, even if not described in the present disclosure, may also be used.

In addition, a ratio of the average diameter of the core 1111a of the dielectric crystal grain 1111 having the core-shell structure to that of the dielectric crystal grain 1111 having the core-shell structure may be about 30% to about 80%, for example, about 36% to about 78%.

In addition, a ratio of an average area of the shell 1111b of the dielectric crystal grain 1111 having the core-shell structure to a total average area of the dielectric crystal grain 1111 having the core-shell structure may be about 20% to about 70%, for example, about 30% to about 70%.

For example, an average thickness of the dielectric layer 111 may be about 0.5 μm to about 10 μm.

The first and second internal electrodes 121 and 122 are electrodes having different polarities, and are alternately disposed to face each other along the T-axis direction with the dielectric layer 111 interposed therebetween, and one end thereof may be exposed through the third and fourth surfaces of the capacitor body 110.

The first and second internal electrodes 121 and 122 may be electrically insulated from each other by the dielectric layer 111 disposed therebetween.

Ends of the first and second internal electrodes 121 and 122 alternately exposed through the third and fourth surfaces of the capacitor body 110 are connected to the first and second external electrodes 131 and 132, respectively, to be electrically connected.

The first and second internal electrodes 121 and 122 may include a conductive metal, for example, a metal such as Ni, Cu, Ag, Pd, or Au, or an alloy thereof, such as an Ag—Pd alloy.

Also, the first and second internal electrodes 121 and 122 may include dielectric particles having the same composition as the ceramic material included in the dielectric layer 111.

The first and second internal electrodes 121 and 122 may be formed using a conductive paste containing a conductive metal. As a method of printing the conductive paste, a screen-printing method or a gravure printing method or the like may be used.

For example, each average thickness of the first and second internal electrode 121 and 122 may be about 0.1 μm to about 2 μm.

The first and second external electrodes 131 and 132 are supplied with voltages of different polarities, and are electrically connected to exposed portions of the first and second internal electrodes 121 and 122, respectively.

According to the above configuration, when a predetermined voltage is applied to the first and second external electrodes 131 and 132, charges are accumulated between the first and second internal electrodes 121 and 122. At this time, a capacitance of the multilayered capacitor 100 is proportional to an overlapping area of the first and second internal electrodes 121 and 122 overlapping each other along the T-axis direction in the active region.

The first and second external electrodes 131 and 132 may respectively include first and second connection portions disposed on the third and fourth surfaces of the capacitor body 110 and connected to the first and second internal electrodes 121 and 122, and may also include first and second band portions disposed at each corner where the third and fourth surfaces of the capacitor body 110 and the first and second surfaces or the fifth and sixth surfaces thereof meet.

The first and the second band portions may extend from the first and second connection portions to portions of the first and second surfaces or fifth and sixth surfaces of the capacitor body 110, respectively. The first and second band portions may serve to improve an adhesion strength of the first and second external electrodes 131 and 132.

For example, the first and the second external electrodes 131 and 132 are configured to cover a sintered metal layer contacting the capacitor body 110, a conductive resin layer configured to cover the sintered metal layer, and a plating layer configured to cover a conductive resin layer, respectively.

The sintered metal layer may include a conductive metal and glass.

For example, the sintered metal layer may include copper (Cu), nickel (Ni), silver (Ag), palladium (Pd), gold (Au), platinum (Pt), tin (Sn), tungsten (W), titanium (Ti), lead (Pb), an alloy thereof, or a combination thereof, as a conductive metal and for example, the copper (Cu) may include a copper (Cu) alloy. When the conductive metal includes copper, a metal other than copper may be included in an amount of less than or equal to about 5 parts by mole based on 100 parts by mole of copper.

For example, the sintered metal layer may include a composition in which an oxide is mixed with glass, and may include, for example, at least one selected from silicon oxide, boron oxide, aluminum oxide, transition metal oxide, alkali metal oxide, and alkaline earth metal oxide. The transition metal may be selected from zinc (Zn), titanium (Ti), copper (Cu), vanadium (V), manganese (Mn), iron (Fe), and nickel (Ni); the alkali metal may be selected from lithium (Li), sodium (Na), and potassium (K); and the alkaline-earth metal may be selected from magnesium (Mg), calcium (Ca), strontium (Sr), and barium (Ba).

The contents of the conductive metal and glass in the sintered metal layer is not particularly limited, but, for example, in a cross-section (L-axis and T-axis cross-sections) perpendicular to the thickness direction (W-axis direction) of the multilayered capacitor 100, an average area of the conductive metal may be about 30% to about 90%, or about 70% to about 90% of the total area of the sintered metal layer.

Optionally, the conductive resin layer is formed on the sintered metal layer, and for example, may be formed to completely cover the sintered metal layer. Meanwhile, the first and second external electrodes 131 and 132 may not include a sintered metal layer, and in this case, the conductive resin layer may directly contact the capacitor body 110.

The conductive resin layer extends to the first and second surfaces or the fifth and sixth surfaces of the capacitor body 110. A length of the region (i.e., the band portion) where the conductive resin layer extends to the first and second surfaces or the fifth and sixth surfaces of the capacitor body 110 may be longer than the length of the region (i.e., the band portion) where the sintered metal layer extends to the first and second surfaces or the fifth and sixth surfaces of the capacitor body 110. That is, the conductive resin layer may be formed on the sintered metal layer and completely cover the sintered metal layer.

The conductive resin layers include a resin and a conductive metal.

The resin included in the conductive resin layers is not particularly limited as long as it has bondability and impact absorption, and may be mixed with the powder of the conductive metal to form a paste. For example, it may include a phenol resin, an acrylic resin, a silicone resin, an epoxy resin, or a polyimide resin.

The conductive metal included in the conductive resin layers serves to be electrically connected to the first and second internal electrodes 121 and 122 or the sintered metal layers.

The conductive metal included in the conductive resin layers may have a spherical shape, a flake shape, or a combination thereof. That is, the conductive metal may be formed only in a flake shape, only in a spherical shape, or may have a mixed shape of a flake shape and a spherical shape.

Herein, the spherical shape may also include a shape that is not perfectly spherical, and may include a shape in which, for example, a length ratio between a major axis and a minor axis (long axis/short axis) may be less than or equal to about 1.45. The flake-type powder means a powder having a flat and elongated shape, and is not particularly limited, but may have, for example, a length ratio between a major axis and a minor axis (long axis/short axis) of greater than or equal to about 1.95.

The first and second external electrodes 131 and 132 may further include a plating layer on the conductive resin layer.

The plating layers may include nickel (Ni), copper (Cu), tin (Sn), palladium (Pd), platinum (Pt), gold (Au), silver (Ag), tungsten (W), titanium (Ti), or lead (Pb) alone or an alloy thereof. For example, the plating layers may be a nickel (Ni) plating layer or a tin (Sn) plating layer, and may have a form in which a nickel (Ni) plating layer and a tin (Sn) plating layer are sequentially stacked or a plating layer, a nickel (Ni) plating layer, and a tin (Sn) plating layer may be sequentially stacked. In addition, the plating layers may include a plurality of nickel (Ni) plating layers and/or a plurality of tin (Sn) plating layers.

The plating layers may improve mountability of the multilayered capacitor 100 with a board, structural reliability, external durability, heat resistance, and equivalent series resistance (ESR).

A method of manufacturing a multilayered capacitor according to another embodiment includes preparing dielectric powder doped with hafnium (Hf), manufacturing a capacitor body including a dielectric layer and an internal electrode, and forming an external electrode on the capacitor body.

First, a method of preparing a dielectric powder doped with hafnium (Hf) is described.

For example, the dielectric powder doped with hafnium (Hf) may be prepared by hydrothermal synthesis. At this time, the hydrothermal synthesis temperature may be greater than or equal to about 180° C. When the hydrothermal synthesis temperature is less than about 180° C., hafnium (Hf) is not dissolved and may be precipitated as a secondary phase without being doped into the dielectric powder.

Figure 5:
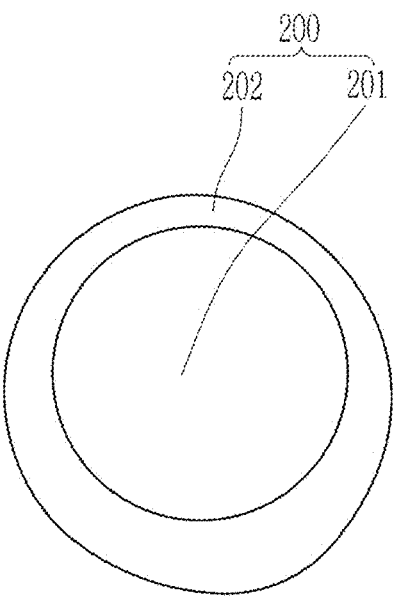
FIG. 5 is a schematic view showing a dielectric powder.

FIG. 5 is a schematic view showing a dielectric powder.

Referring to FIG. 5, the prepared dielectric powder 200 doped with hafnium (Hf) may have a core-shell structure. That is, the core 201 of the dielectric powder 200 doped with hafnium (Hf) may include BaTiOs and the shell 202 may include Ba(Ti, Hf)O$_3$.

In the dielectric powder doped with hafnium (Hf), the atom % of hafnium may be less than or equal to about 3 atom % based on the total dielectric powder. When the content of hafnium exceeds about 3 atom %, it is not dissolved in the dielectric powder, and a secondary phase including hafnium (Hf) may be formed.

First, the manufacturing of the capacitor body is described.

In the manufacturing process of the capacitor body, a dielectric paste to become the dielectric layer after firing and a conductive paste to become the internal electrode after firing are prepared.

The dielectric paste is prepared, for example, by the following method. The prepared dielectric powder doped with hafnium (Hf) are uniformly mixed by means such as wet mixing, dried, and heat-treated under predetermined conditions to obtain calcined powder. To the obtained calcined powder, an organic vehicle or an aqueous vehicle is added and kneaded to prepare a dielectric paste.

A dielectric green sheet is obtained by forming the obtained dielectric paste into a sheet by a doctor blade method or the like. In addition, the dielectric paste may include an additive selected from various dispersants, plasticizers, dielectrics, subcomponent compounds, or glass as needed.

Conductive paste for the internal electrode is prepared by kneading conductive powder made of a conductive metal or an alloy thereof with a binder or a solvent. The conductive paste for the internal electrode may include ceramic powder (for example, barium titanate powder) as a co-material, if necessary. The co-material may act to suppress sintering of the conductive powder during the firing process.

On the surface of the dielectric green sheet, the conductive paste for an internal electrode is applied in a predetermined pattern by various printing methods such as screen printing or a transfer method. After stacking a plurality of layers of dielectric green sheets on which internal electrode patterns are formed, a dielectric green sheet stack is obtained by pressing in the stacking direction. At this time, the dielectric green sheets and internal electrode patterns may be stacked so that the dielectric green sheets may be disposed on the upper and lower surfaces of the dielectric green sheet stack in the stacking direction.

Optionally, the obtained dielectric green sheet stack may be cut into predetermined dimensions by dicing or the like.

In addition, the dielectric green sheet stack may be solidified and dried to remove the plasticizer, etc. and barrel-polished by using a centrifugal barrel machine or the like after the solidification-drying. In the barrel polishing, the dielectric green sheet stack is put with a medium and a polishing liquid into a barrel container, and then, the barrel container is applied with rotational motion or vibration to polish unnecessary parts such as burrs and the like generated during the cutting. In addition, after the barrel polishing, the dielectric green sheet stack is washed with a cleaning solution such as water and the like and dried.

The dielectric green sheet stack is treated to remove the binder and fired, obtaining the capacitor body.

The binder removal may be performed under conditions appropriately adjusted according to a main component composition of the dielectric layer or a main component composition of the internal electrode. For example, the binder removal may be performed by increasing a temperature at about 5° C./hr to about 300° C./hr and maintaining about 180° C. to about 400° C. for about 0.5 hours to about 24 hours. The binder removal may be performed under an air atmosphere or a reducing atmosphere.

The firing treatment may be performed under conditions appropriately adjusted according to the main component composition of the dielectric layer or the main component composition of the internal electrode. For example, the firing may be performed at about 1200° C. to about 1350° C. or about 1220° C. to about 1300° C. for about 0.5 hours to about 8 hours or about 1 hour to about 3 hours. The firing may be performed under a reducing atmosphere, for example, an atmosphere in which a mixed gas of nitrogen gas ($N_2$) and hydrogen gas ($H_2$) is humidified. When the internal electrode includes nickel (Ni) or a nickel (Ni) alloy, an oxygen partial pressure may be about $1.0 \times 10^{-14}$ MPa to about $1.0 \times 10^{-10}$ MPa under the firing atmosphere.

After the firing treatment, annealing may be performed, if needed. The annealing is performed for re-oxidizing the dielectric layer, and when the firing is performed under a reducing atmosphere, the annealing may be performed. The annealing may be performed under conditions appropriately adjusted according to the main component composition and the like of the dielectric layer. For example, the annealing may be performed at about 950° C. to about 1150° C. for about 0 hour to about 20 hours by increasing the temperature at about 50° C./hour to about 500° C./hour. The annealing may be performed under a humid nitrogen gas ($N_2$) atmosphere, wherein an oxygen partial pressure may be about $1.0 \times 10^{-9}$ MPa to about $1.0 \times 10^{-5}$ MPa.

In the binder removal treatment, the firing treatment, or the annealing treatment, in order to humidify nitrogen gas, mixed gas, or the like, a wetter atmosphere or the like may be, for example, used, wherein a water temperature may be about 5° C. to about 75° C. The binder removal treatment, the firing treatment, and the annealing treatment may be performed continuously or independently.

Optionally, the third and fourth surfaces of the obtained capacitor body may be surface-treated through sandblasting, laser irradiation, barrel polishing, or the like. This surface treatment may expose the ends of the first and second internal electrode on the outer surfaces of the third and fourth surfaces, thereby improving the electrical connection of the first and second external electrodes and the first and second internal electrodes and easily forming the alloy portion.

The sintered metal layer as an external electrode may be formed by coating a paste for forming a sintered metal layer on the outer surface of the obtained capacitor body and then sintering the paste.

The paste for the sintered metal layer may include a conductive metal and glass. The conductive metal and glass are the same as above and will not be repeatedly illustrated. In addition, the paste for forming the sintered metal layer may optionally include a subcomponent such as a binder, a solvent, a dispersant, a plasticizer, or oxide powder. For example, the binder may include ethyl cellulose, acryl, butyral, or the like, and the solvent may include an organic solvent such as terpineol, butyl carbitol, alcohol, methylethylketone, acetone, or toluene, or an aqueous solvent.

A method of coating the paste for forming the sintered metal layer on the outer surface of the capacitor body may include various printing methods such as a dip method, or screen printing, and the like, a coating method by using a dispenser, a spray method by using a spray, and the like. The paste for forming the sintered metal layer may be coated on at least the third and fourth surfaces of the capacitor body and optionally, on a portion of the first surface, the second surface, the fifth surface, or the sixth surface where the band portions of the first and second external electrodes are formed.

Thereafter, the capacitor body on which the paste for forming the sintered metal layer is coated is dried and sintered at a temperature of about 700° C. to about 1000° C. for about 0.1 hour to about 3 hours to form the sintered metal layer.

Optionally, the conductive resin layer may be formed by coating a paste for forming the conductive resin layer on the outer surface of the resulting capacitor body and then curing the paste.

The paste for forming the conductive resin layer may include a resin, and optionally a conductive metal or a non-conductive filler. The conductive metal and resin are the same as above and will not be repeatedly illustrated. In addition, the paste for forming the conductive resin layer may optionally include a subcomponent such as a binder, a solvent, a dispersant, a plasticizer, or an oxide powder. For example, the binder may include ethyl cellulose, acryl, butyral, or the like, and the solvent may include an organic solvent such as terpineol, butyl carbitol, alcohol, methylethylketone, acetone, or toluene, or an aqueous solvent.

For example, a method of forming the conductive resin layer may include dipping the capacitor body 110 into the paste for forming the conductive resin layer to form the conductive resin layer and curing it, screen-printing or gravure-printing the paste for forming the conductive resin layer on the surface of the capacitor body 110, or coating the paste for forming the conductive resin layer on the surface of the capacitor body 110 and then curing it.

Next, a plating layer is formed on the outside of the conductive resin layer.

For example, the plating layer may be formed by a plating method, or may be formed by sputtering or electroplating (electric deposition).

Hereinafter, specific embodiments of the disclosure are presented. However, the examples described below are only for specifically illustrating or explaining the disclosure, and the scope of the disclosure is not limited thereto.

Preparation Example 1: Preparation of Dielectric

BaTiOs doped with hafnium (Hf) is prepared in a hydrothermal synthesis method. For example, $TiO_2$ peptization sol and BaOH are hydrothermally synthesized at a high temperature to prepare BaTiOs seeds, and then, the $BaTiO_3$ seeds are mixed with $HfO_2$ at room temperature. Based on the total moles of hafnium and BaTiOs, hafnium in an amount of 1 mol %, 3 mol %, and 5 mol % is respectively added thereto, and additives including silicon (Si) and dysprosium (Dy) are added thereto. The obtained mixture is mixed for about 2 hours and heated to a synthesis temperature to grow grains, preparing BaTiOs doped with hafnium.

When the hafnium content is greater than 3 mol %, generation of $HfO_2$-related secondary phases is confirmed. Accordingly, in order to apply the BaTiOs doped with hafnium to a multilayered capacitor, the hafnium should be doped at 3 mol % or less. The BaTiOs powder doped with 1 mol % of hafnium, when examined with TEM-EDX, consists of a BaTiOs core and a BaTiOs shell doped with the hafnium. In addition, the core has a size of 100 nm to 120 nm, and the shell has a thickness of 10 nm to 20 nm.

In order to check dielectric characteristics of the BaTiOs powder doped with hafnium (1 mol % of Hf) (Example 1), a dielectric (Comparative Example 1) is prepared by adding the same amount of an additive as in Example 1 to pure BaTiOs powder, and a dielectric (Comparative Example 2) is prepared by adding the additive in the same amount to a sol in which 99 mol % of the pure BaTiOs powder and 1 mol % of $HfO_2$ are mixed.

Experimental Example 1: Measurement of
Dielectric Properties

As a result of examining the dielectrics having the same density of 5.8 $g/cm^3$ according to Example 1 and Comparative Examples 1 and 2 by taking scanning electron microscope (SEM) photographs, the dielectric prepared in Comparative Example 1 has a grain size of 763 nm, but the dielectric prepared in Example 1 has a grain size of 355 nm, and the dielectric of Comparative Example 2 has a grain size of 298 nm, which are suppressed. The reason is that hafnium (Hf) suppresses the grain growth, realizing a small and uniform grain size.

Figure 6:
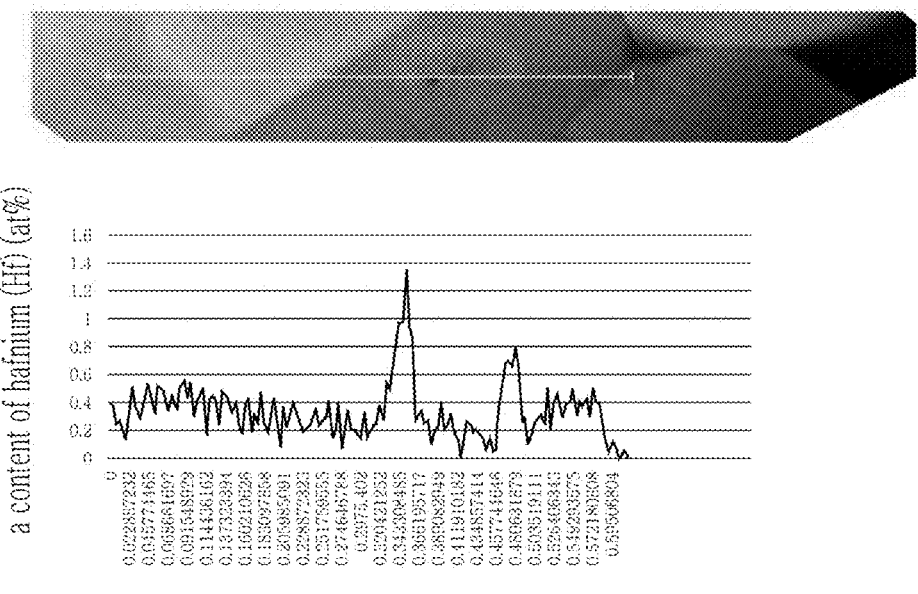
FIG. 6 shows a transmission electron microscope (TEM) photograph of the dielectric crystal grains prepared in Example 1 and the results of measuring a content of hafnium (Hf) according to the locations within the dielectric crystal grain by energy dispersive X-ray analysis (EDX).
Figure 7:
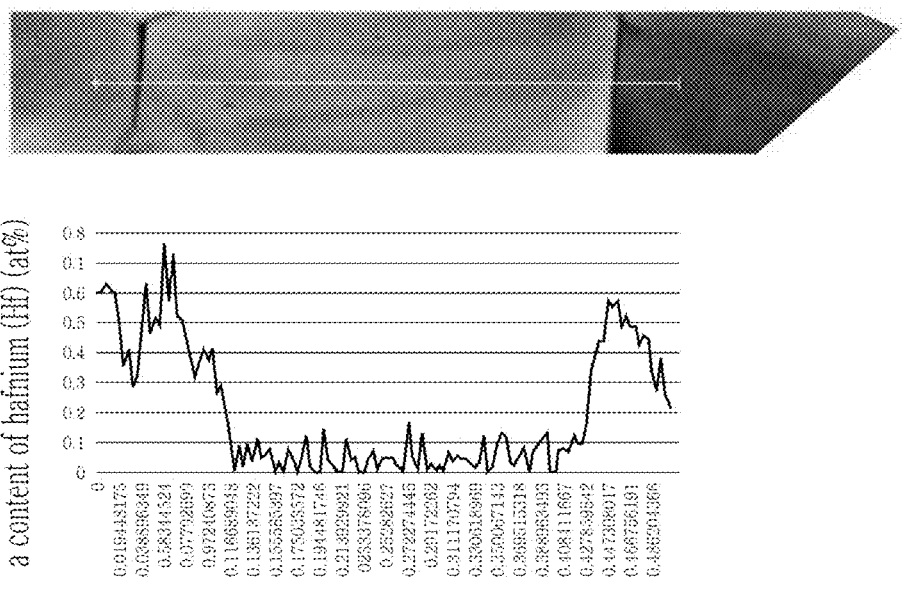
FIG. 7 shows a transmission electron microscope (TEM) photograph of the dielectric crystal grains prepared in Comparative Example 2 and the results of measuring a content of hafnium (Hf) according to the locations within the dielectric crystal grain by energy dispersive X-ray analysis (EDX).

FIGS. 6 and 7 show transmission electron microscope (TEM) photographs of the dielectric crystal grains prepared in Example 1 and Comparative Example 2 and the results of measuring a content of hafnium (Hf) according to the locations within the dielectric crystal grain by energy dispersive X-ray analysis (EDX), respectively.

Referring to FIGS. 6 and 7, the dielectric prepared by applying hafnium-doped BaTiOs powder (Example 1) shows that the hafnium is uniformly doped, but the dielectric sintered by adding $HfO_2$ (Comparative Example 2) shows $HfO_2$ secondary phases at the grain boundary.

In addition, in FIG. 6, a contrast difference may be used to distinguish the boundary between the shell and the grain boundary as well as the boundary between the core and the shell.

For example, as a result of the line analysis of the dielectric crystal grains according to Example 1 and Comparative Example 2 through the transmission electron microscope-energy dispersive X-ray analysis (TEM-EDX), in the dielectric crystal grain of Example 1, hafnium is present in the highest content around the boundary between the core and the shell but decreases toward the grain boundary of the shell. On the contrary, in the dielectric crystal grain of Comparative Example 2, hafnium is mainly present at the grain boundary. Without being bound to a specific theory, $HfO_2$ has a high melting point (melting temperature) and is difficult to diffuse into the grains and thus is suppressed from diffusion into the grains, but in hafnium-doped BaTiOs powder, since hafnium has already been present in $BaTiO_3$, hafnium easily diffuses into the grains.

Figure 8:
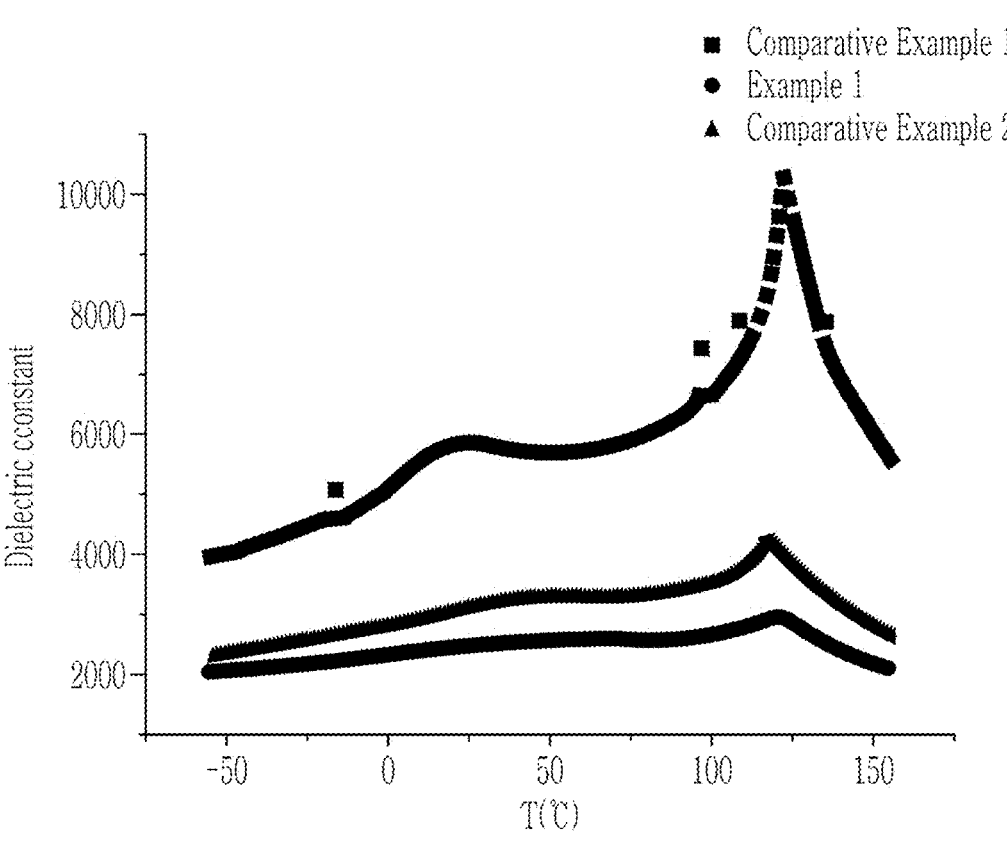
FIG. 8 is a graph showing dielectric characteristics according to a temperature of dielectrics prepared in Example 1, Comparative Example 1, and Comparative Example 2.
Figure 9:
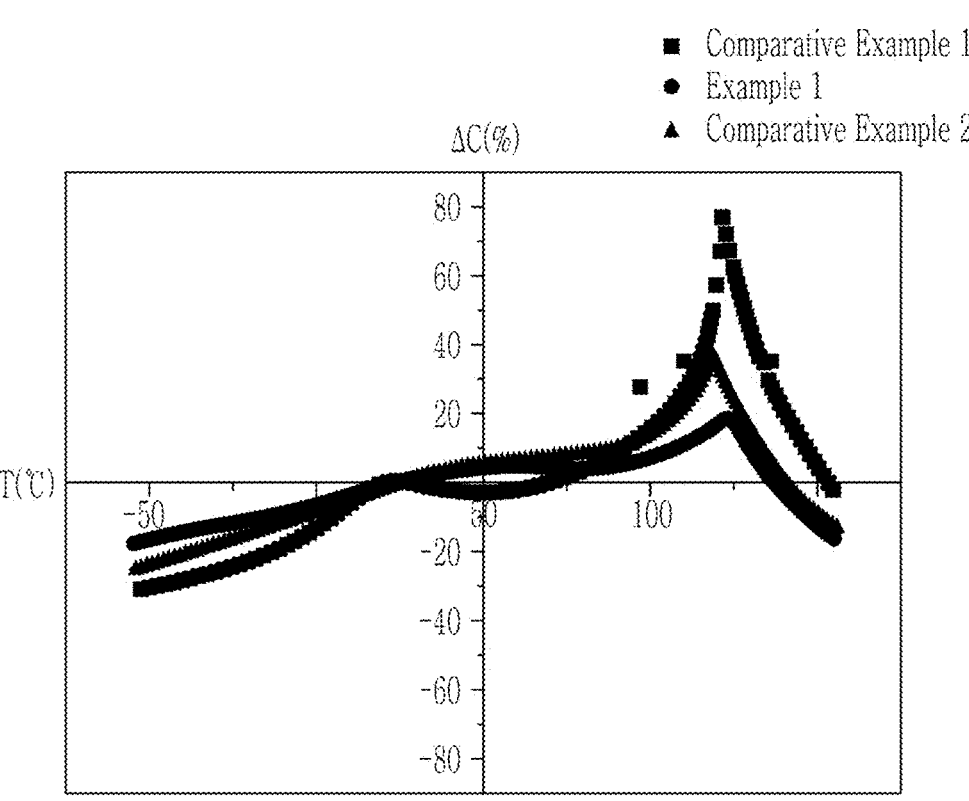
FIG. 9 is a graph showing dielectric characteristics according to a temperature of dielectrics prepared in Example 1, Comparative Example 1, and Comparative Example 2.

FIGS. 8 and 9 is a graph showing dielectric characteristics according to a temperature of dielectrics prepared in Example 1, Comparative Example 1, and Comparative Example 2 and Table 1 summarizes the data of FIG. 9.

TABLE 1

|  | −55° C. | 25° C. | 85° C. | 105° C. | 125° C. | $T_m$ |
|---|---|---|---|---|---|---|
| Comparative Example 1 | −31.5% | 0 ($\varepsilon$ = 5800) | 5.2% | 19% | 64.9% | 122° C. |
| Comparative Example 2 | −25.8% | 0 ($\varepsilon$ = 3100) | 8.8% | 18% | 56.7% | 118° C. |
| Example 1 | −17.8 & | 0 ($\varepsilon$ = 2500) | 4% | 8.2% | 16.4% | 123° C. |

Referring to FIGS. 8 and 9 and Table 1, as the dielectric prepared in Example 1 is uniformly doped with hafnium, a dielectric constant and a variation ratio according to a temperature are the lowest. As for a Curie temperature, the dielectric prepared in Comparative Example 1 is 122° C., the dielectric prepared in Comparative Example 2 is 118° C., and the dielectric prepared in Example 1 is 123° C. In the dielectric prepared in Example 1, as the hafnium is present around the boundary between the core and the shell, even when the hafnium is included, the Curie temperature is prevented from moving to a low temperature.

Figure 10:
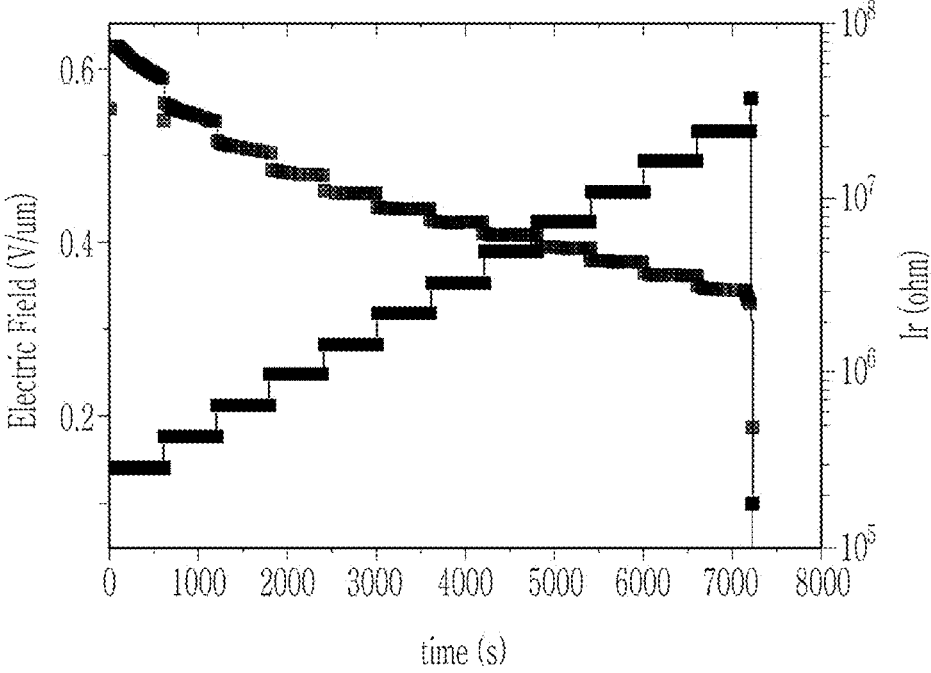
FIG. 10 is a graph showing withstand voltage characteristics of the dielectric prepared in Example 1.
Figure 11:
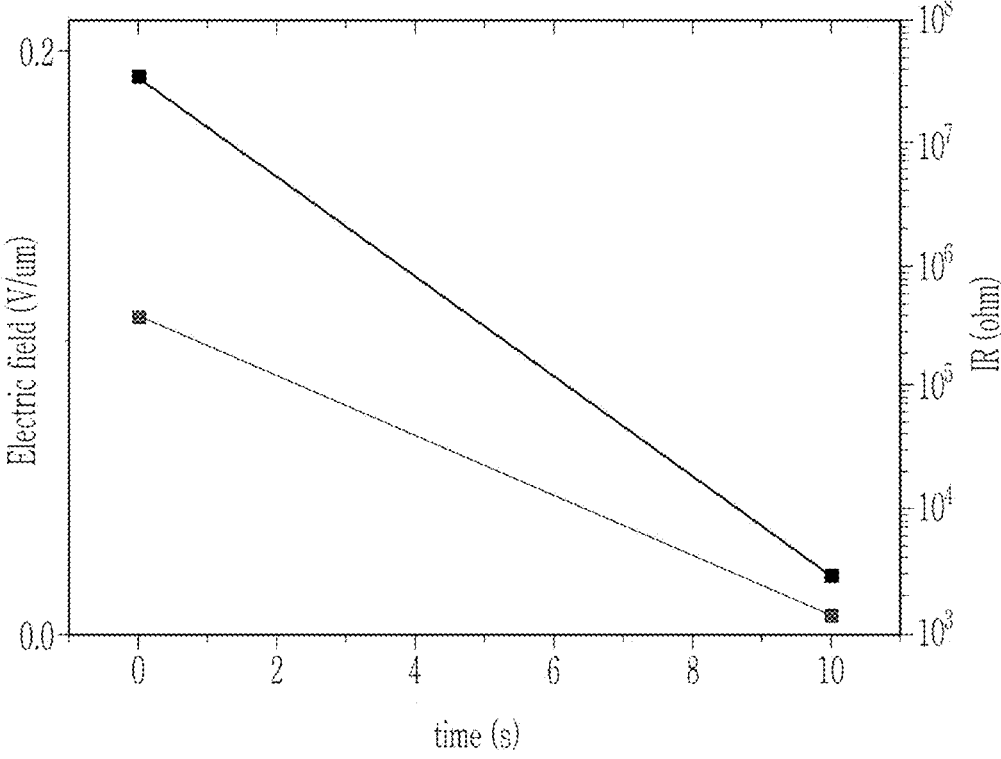
FIG. 11 is a graph showing withstand voltage characteristics of the dielectric prepared in Comparative Example 1.
Figure 12:
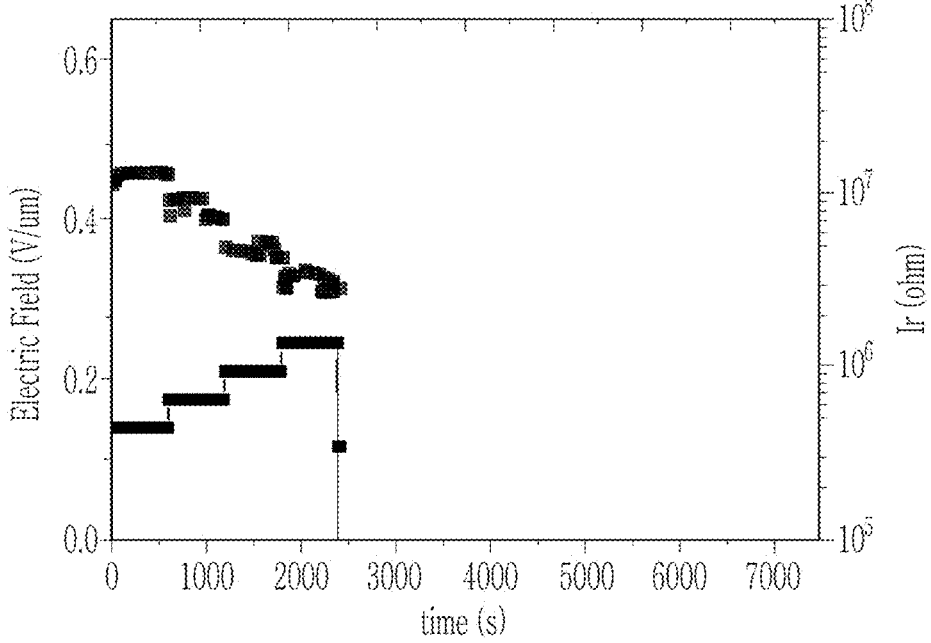
FIG. 12 is a graph showing withstand voltage characteristics of the dielectric prepared in Comparative Example 2.

FIGS. 10 to 12 are graphs showing withstand voltage characteristics of dielectric layers prepared in Example 1, Comparative Example 1, and Comparative Example 2, respectively.

FIGS. 10 to 12 show the results of applying an electric field at 180° C. in order to compare insulating properties of the dielectrics at a high temperature under a high pressure. The dielectric prepared in Comparative Example 1 immediately fails by the applied electric field, but the dielectric prepared in Example 1 fails at an electric field of 0.57 V/μm, and the dielectric of Comparative Example 2 fails at 0.25 V/μm. Accordingly, a dielectric in which hafnium is uniformly doped inside the grains turns out to have excellent insulating properties at a high temperature under a high pressure.

Manufacture Example 2: Manufacture of Multilayered Capacitor

As a dielectric base material, a dielectric (Example 1) of BaTiOs powder doped with hafnium (1 mol % of Hf) and a dielectric (Comparative Example 1) in which the same amount of an additive as in Example 1 is added to pure BaTiOs powder are respectively used and mixed with ethanol/toluene, a dispersant, and a binder and then, mechanically milled to prepare each dielectric slurry.

The prepared dielectric slurry is manufactured into a dielectric green sheet by using a head discharge-type on-roll molding coater.

On the dielectric green sheet surface, a conductive paste layer including nickel (Ni) is printed, and the dielectric green sheets coated with the conductive paste layer on the surface (width×length×height=3.2 mm×2.5 mm×2.5 mm) are stacked and compressed to manufacture a dielectric green sheet stack.

The dielectric green sheet stack is calcined at less than or equal to 400° C. under a nitrogen atmosphere and then, fired at less than or equal to 1300° C. at a hydrogen $(H_2)$ concentration of less than or equal to 1.0% to manufacture a capacitor body, and on the outside of the capacitor body, an external electrode is formed to manufacture a multilayered capacitor.

Experimental Example 2: Performance Measurement of Multilayered Capacitor

The manufactured multilayered capacitor is cured in an epoxy mixed solution, polished on the W-axis and T-axis direction sides of the capacitor body to a ½ point of a L-axis direction, and then, maintained in a vacuum atmosphere chamber and fixed thereinto, obtaining a cross-section sample of the multilayered capacitor.

Figure 13:
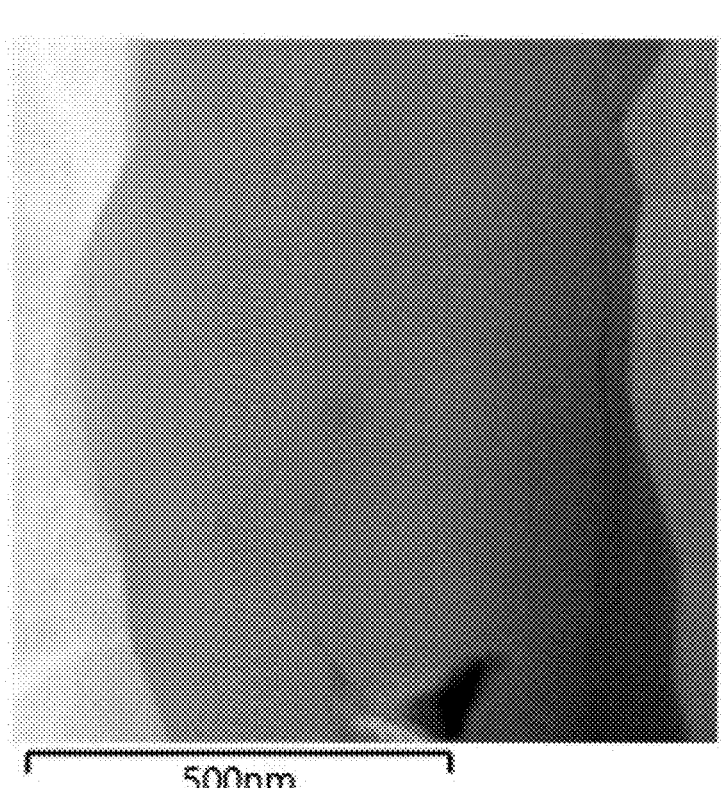
FIG. 13 is a photograph of the dielectric layer in the active region observed with a transmission electron microscope (TEM) in a cross-sectional sample of the multilayered capacitor manufactured using the dielectric of Example 1.
Figure 14:
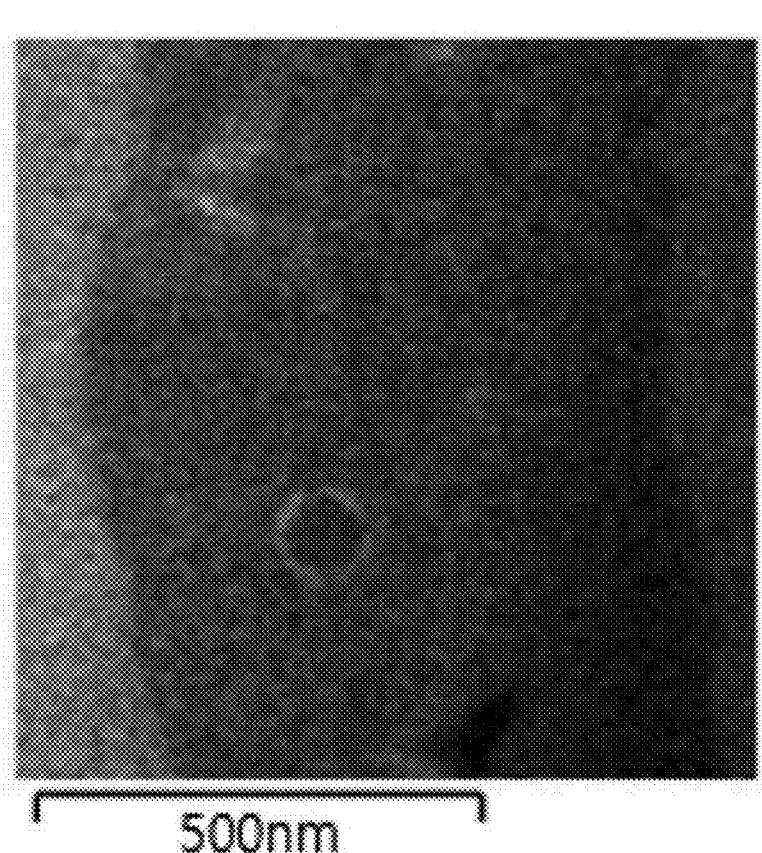
FIG. 14 is a photograph showing the results of measuring the content of hafnium (Hf) using energy dispersive X-ray analysis (EDX) in FIG. 13.

FIG. 13 is a photograph of the dielectric layer in the active region observed with a transmission electron microscope (TEM) in a cross-sectional sample of the multilayered capacitor manufactured using the dielectric of Example 1 and FIG. 14 is a photograph showing the results of measuring the content of hafnium (Hf) using energy dispersive X-ray analysis (EDX) in FIG. 13.

In FIG. 13, a dark gray region in the middle indicates the dielectric layer, and light gray regions at both sides of the dielectric layer indicate internal electrodes.

Referring to FIG. 14, in the dielectric layer, a dielectric grain having a core-shell structure of a core with a low hafnium concentration (dark) and a shell with high hafnium concentration (bright) is observed.

Figure 15:
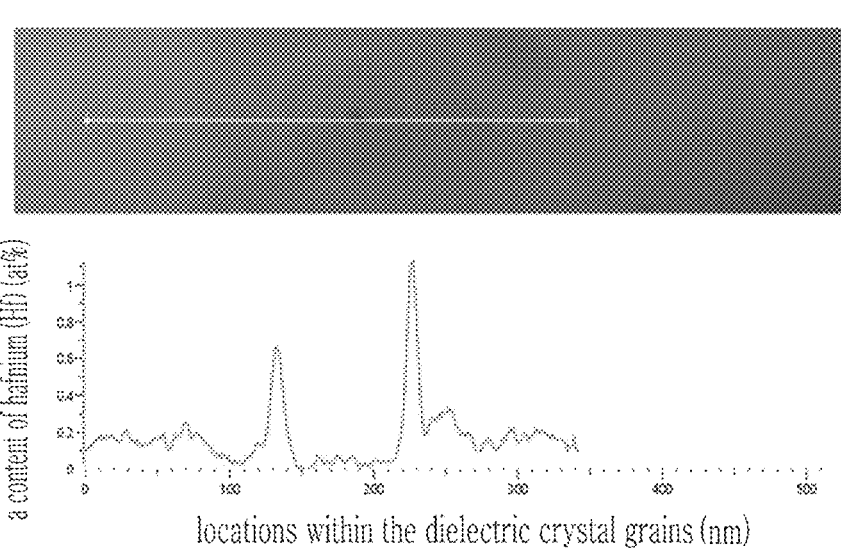
FIG. 15 shows the results of line analysis of dielectric grains having a core-shell structure observed in FIG. 14 using transmission electron microscopy-energy dispersive X-ray analysis (TEM-EDX).

FIG. 15 shows the results of line analysis of dielectric grains having a core-shell structure observed in FIG. 14 using transmission electron microscopy-energy dispersive X-ray analysis (TEM-EDX). Referring to FIG. 15, the hafnium has the highest concentration near a boundary of the core and the shell but gradually decreases toward the grain boundary region.

In addition, 40 samples of each multilayered capacitor respectively manufactured by using the dielectrics of Example 1 and Comparative Example 1 are mounted on a substrate and then, measured with respect to high temperature/high pressure reliability (HALT) by using ESPEC (PV-222, HALT) equipment at 125° C. for 48 hours at 9.45 V, and the results are shown in Table 2.

TABLE 2

|  | Average initial insulation resistance (Ω) | Mean time to failures (h) |
|---|---|---|
| Example 1 | $1.3 \times 10^5$ | 3.58 |
| Comparative Example 1 | $2.2 \times 10^7$ | 11.1 |

Referring to Table 2, the multilayered capacitor manufactured by using the dielectric of Example 1 exhibits improved high temperature/high pressure reliability, compared with the multilayered capacitor manufactured by using the dielectric of Comparative Example 1.

While this disclosure has been described in connection with what is presently considered to be practical example embodiments, it is to be understood that the disclosure is not limited to the disclosed embodiments. On the contrary, it is intended to cover various modifications and equivalent arrangements included within the spirit and scope of the appended claims.

What is claimed is:

1. A multilayered capacitor, comprising
a capacitor body including a dielectric layer and an internal electrode, and
an external electrode on the capacitor body,
wherein the dielectric layer includes a plurality of dielectric crystal grains,
at least one of the plurality of dielectric crystal grains has a core-shell structure including a core and a shell on the core,
the shell includes hafnium (Hf), and
in a line analysis using transmission electron microscope-energy dispersive X-ray analysis (TEM-EDX) on the at least one of the plurality of dielectric crystal grains having the core-shell structure, among results from a center of the core to a grain boundary on any side of the at least one of the plurality of dielectric crystal grains having the core-shell structure, the shell has a first peak having the largest atom % of hafnium based on all atoms in the shell, and the first peak is located closer to the core than to the grain boundary.

2. The multilayered capacitor of claim 1, wherein an atom % of hafnium at the grain boundary of the shell is smaller than the first peak.

3. The multilayered capacitor of claim 1, wherein the shell further has a second peak having a second largest atom % of hafnium, and the second peak is located between the first peak and grain boundary.

4. The multilayered capacitor of claim 3, wherein when the atom % of hafnium in the first peak is $N_{Hf,1st-peak}$,
the atom % of hafnium in the second peak is $N_{Hf,2nd-peak}$, and
the atom % of hafnium at the grain boundary is $N_{Hf,GB}$,
$N_{Hf,1st-peak}>N_{Hf,2nd-peak}>N_{Hf,GB}$ is satisfied.

5. The multilayered capacitor of claim 3, wherein the atom % of hafnium in the shell
increases from a boundary between the core and the shell to the first peak,
increases to the second peak after passing the first peak, and
decreases from the second peak to the grain boundary.

6. The multilayered capacitor of claim 1, wherein when the atom % of hafnium at the first peak is $N_{Hf,1st-peak}$,
the atom % of hafnium at a midpoint between the first peak and the grain boundary is $N_{Hf,middle}$, and
the atom % of hafnium at the grain boundary is $N_{Hf,GB}$,
$N_{Hf,1st-peak}>N_{Hf,middle}>N_{Hf,GB}$ is satisfied.

7. The multilayered capacitor of claim 6, wherein the atom % of hafnium in the shell
increases from a boundary between the core and the shell to the first peak, decreases or remains constant to a midpoint after passing the first peak, and
decreases from the midpoint to the grain boundary.

8. The multilayered capacitor of claim 1, wherein the first peak is located within 10 nm from the boundary between the core and the shell.

9. The multilayered capacitor of claim 1, wherein the plurality of dielectric crystal grains include:
$BaTiO_3$ as a main component, and
hafnium (Hf), manganese (Mn), chromium (Cr), silicon (Si), aluminum (Al), magnesium (Mg), tin (Sn), antimony (Sb), germanium (Ge), gallium (Ga), indium (In), dysprosium (Dy), or a combination thereof as a subcomponent.

10. The multilayered capacitor of claim 9, wherein the hafnium (Hf) is doped into the $BaTiO_3$.

11. The multilayered capacitor of claim 10, wherein the core includes $BaTiO_3$, and
the shell includes $Ba(Ti, Hf) O_3$.

12. The multilayered capacitor of claim 9, wherein the shell includes the subcomponent in a total amount of greater than 0.1 moles and less than or equal to 30.0 parts by mole relative to 100 parts by mole of the main component, and
the core includes the subcomponent in a total amount of less than or equal to 0.1 parts by mole relative to 100 parts by mole of the main component.

13. The multilayered capacitor of claim 1, wherein an average grain size of the plurality of dielectric crystal grains is greater than or equal to 50 nm and less than or equal to 300 nm.

14. A method of manufacturing a multilayered capacitor, comprising
preparing dielectric powder doped with hafnium (Hf),
manufacturing a dielectric green sheet using the dielectric powder, and forming a conductive paste layer on a surface of the dielectric green sheet,
stacking dielectric green sheets having the conductive paste layer formed thereon to manufacture a dielectric green sheet stack,
firing the dielectric green sheet stack to manufacture a capacitor body including a dielectric layer and an internal electrode, and
forming an external electrode on one surface of the capacitor body,
wherein the dielectric layer includes a plurality of dielectric crystal grains,
at least one of the plurality of the dielectric crystal grains has a core-shell structure including a core and a shell on the core,
the shell includes hafnium (Hf), and
in a line analysis using transmission electron microscope-energy dispersive X-ray analysis (TEM-EDX) on the at least one of the plurality of dielectric crystal grains having the core-shell structure, among results from a center of the core to a grain boundary on any side of the at least one of the plurality of dielectric crystal grains having the core-shell structure, the shell has a first peak having the largest atom % of hafnium based on all atoms in the shell, and
the first peak is located closer to the core than to the grain boundary.

15. The method of claim 14, wherein the dielectric powder doped with hafnium (Hf) has a core-shell structure including a first core and a first shell on the first core.

16. The method of claim 15, wherein
the core includes BaTiO$_3$, and
the shell includes Ba(Ti, Hf) O$_3$.

17. The method of claim 15, wherein
the dielectric powder doped with hafnium (Hf) includes
hafnium (Hf) at less than or equal to 3 atom % based
on a total dielectric powder.

18. The method of claim 14, wherein
the dielectric powder doped with hafnium (Hf) is prepared
by hydrothermal synthesis at 180° C. or higher.

19. A method of manufacturing a multilayered capacitor,
comprising
preparing dielectric powder doped with hafnium (Hf) at
less than or equal to 3 atom % based on a total dielectric
powder,
manufacturing a dielectric green sheet using the dielectric
powder, and forming a conductive paste layer on a
surface of the dielectric green sheet,
stacking dielectric green sheets having the conductive
paste layer formed thereon to manufacture a dielectric
green sheet stack,
firing the dielectric green sheet stack to manufacture a
capacitor body including a dielectric layer and an
internal electrode, and
forming an external electrode on one surface of the
capacitor body,
wherein the dielectric layer includes a plurality of dielec-
tric crystal grains,
at least one of the plurality of the dielectric crystal grains
has a core-shell structure including a core and a shell on
the core,
the shell includes hafnium (Hf), and
in a line analysis using transmission electron microscope-
energy dispersive X-ray analysis (TEM-EDX) on the at
least one of the plurality of dielectric crystal grains
having the core-shell structure, among results from a
center of the core to a grain boundary on any side of the
at least one of the plurality of dielectric crystal grains
having the core-shell structure, the shell has a first peak
having the largest atom % of hafnium based on all
atoms in the shell, and
the first peak is located closer to the core than to the grain
boundary.

20. The method of claim 19, wherein
the dielectric powder doped with hafnium (Hf) is prepared
by hydrothermal synthesis at 180° C. or higher.

21. The method of claim 20, wherein the dielectric
powder doped with hafnium (Hf) has a core-shell structure
including a first core and a first shell on the first core.

22. The method of claim 21, wherein the dielectric
powder is further doped with silicon (Si) and dysprosium
(Dy).

23. The method of claim 22, wherein
the core includes BaTiO$_3$, and
the shell includes Ba(Ti, Hf) O$_3$.

24. A multilayered capacitor, comprising
a capacitor body including a dielectric layer and an
internal electrode, and
an external electrode on the capacitor body,
wherein the dielectric layer includes a plurality of dielec-
tric crystal grains including:
a main component, and
a subcomponent including hafnium (Hf),
at least one of the plurality of dielectric crystal grains has
a core-shell structure including a core and a shell on the
core,
the shell includes the subcomponent in a total amount of
greater than 0.1 moles and less than or equal to 30.0
parts by mole relative to 100 parts by mole of the main
component,
the core includes the subcomponent in a total amount of
less than or equal to 0.1 parts by mole relative to 100
parts by mole of the main component, and
in a line analysis using transmission electron microscope-
energy dispersive X-ray analysis (TEM-EDX) on the at
least one of the plurality of dielectric crystal grains
having the core-shell structure, among results from a
center of the core to a grain boundary on any side of the
at least one of the plurality of dielectric crystal grains
having the core-shell structure, the shell has a first peak
having the largest atom % of hafnium based on all
atoms in the shell, and
the first peak is located closer to the core than to the grain
boundary.

25. The multilayered capacitor of claim 24, wherein the
subcomponent further includes silicon (Si) and dysprosium
(Dy).

26. The multilayered capacitor of claim 25, wherein
an atom % of hafnium at the grain boundary of the shell
is smaller than the first peak.

27. The multilayered capacitor of claim 24, wherein
the first peak is located within 10 nm from the boundary
between the core and the shell.

28. The multilayered capacitor of claim 24, wherein
the main component includes BaTiO$_3$.

* * * * *